Aug. 30, 1927.
F. AMMON
SEAT ADJUSTER
Filed Oct. 9, 1925
1,640,812
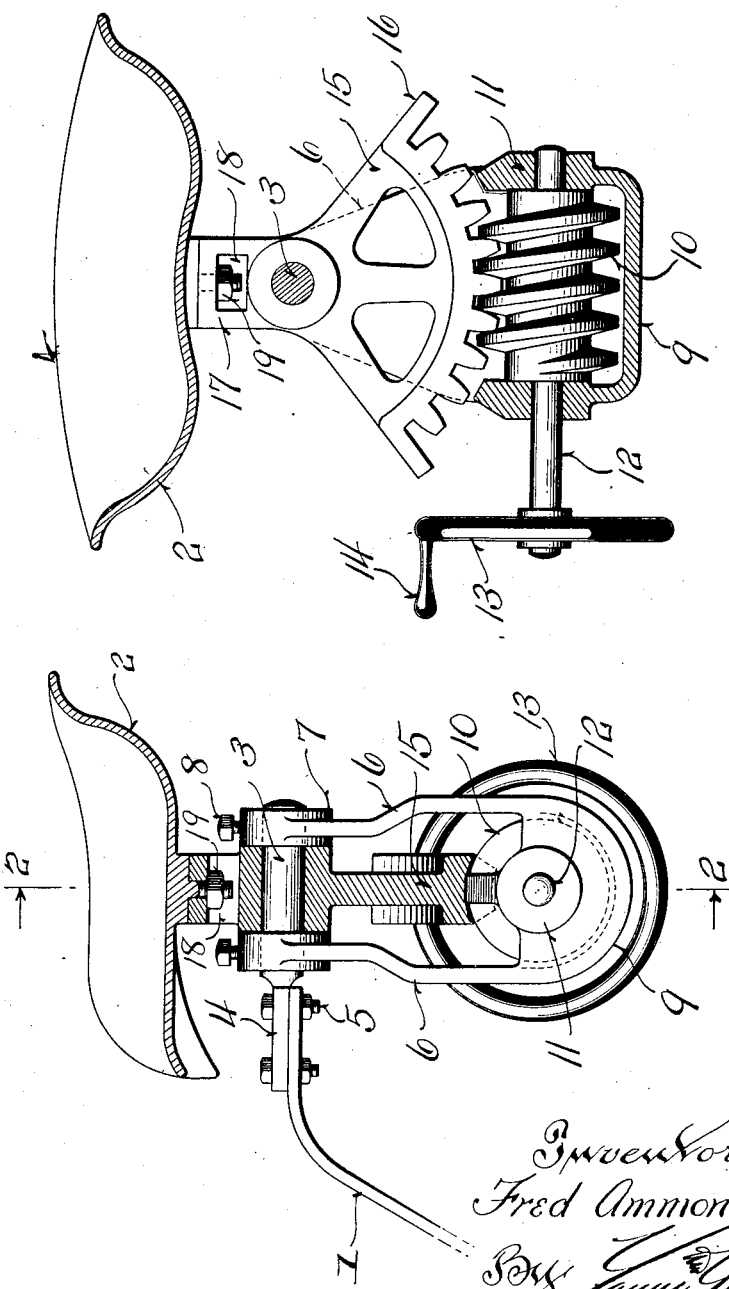

Patented Aug. 30, 1927.

1,640,812

UNITED STATES PATENT OFFICE.

FRED AMMON, OF WAUKEGAN, ILLINOIS.

SEAT ADJUSTER.

Application filed October 9, 1925. Serial No. 61,484.

This invention relates to seat adjusters, and is particularly related to a seat adjuster for tractors and similar machines.

It is well known that it frequently happens in operating tractors or other machines that long drives are necessary across the side of a hill, so that the operator's seat is in a slanting and uncomfortable position. On the reverse trip across the field, the seat is correspondingly tilted in the other direction to the discomfort of the operator.

This invention is designed to overcome the above noted defects, and objects of such invention are to provide seat adjusting mechanism which may be readily attached to a standard tractor and seat, which will adjust the seat to the desired angle irrespective of the ground upon which the tractor is operating, and which will thus aid materially in the comfort of the operator.

Further objects are to provide a device for adjusting the seat, which may be operated without requiring dismounting from the seat, and which is of extreme simplicity and may be very readily attached to standard equipment.

An embodiment of the invention is shown in the accompanying drawings, in which:—

Figure 1 is a side view partly in section of the device.

Figure 2 is a transverse sectional view on the line 2—2 of Figure 1.

Referring to the drawings, it will be seen that the main supporting bar 1 for the seat 2 has been shown as extending upwardly and rearwardly in the usual manner. The device is interposed between this bar and the seat and preferably the bar is cut off shorter than its usual length and suitable holes are drilled therethrough for the attaching bolts.

The device comprises a main bearing pin 3 which is provided with a flattened extension 4 adapted to rest upon the supporting bar 1. These portions 1 and 4 are secured together by means of bolts 5, as indicated in Figure 1.

The main frame of the seat adjusting device comprises a pair of side arms 6 which are apertured and carried by the bearing pin 3. The hubs 7 of the side arms are provided with set screws 8 adapted to lock such arms to the pin 3 in the desired position, as shown in Figures 1 and 2. The arms 6 are somewhat triangular in contour, as indicated in Figure 2, and carry a casing 9 for an adjusting worm 10. The casing 9 is provided with end portions 11 constituting bearings for the worm 10. The shaft 12 of the worm is extended through one of the end members and is provided with an operating hand wheel 13 equipped with a crank 14.

A segmental gear 15 is loosely mounted upon the supporting bearing pin 3 and meshes with the worm 10. This gear is in reality a portion of a worm wheel and is preferably provided with stops 16 at opposite ends adapted to contact with the ends 11 of the casing 9 to thus limit the swing of the segmental gear. This segmental gear has an upwardly extending integral portion 17 provided with a transverse aperture 18. The seat 2 is preferably bolted directly to the member 17 and the nut 19 is positioned within the aperture 18 to provide a very compact construction.

In using the device it is merely necessary for the operator to reach over the side of the seat and manipulate the hand wheel 13 by means of the crank 14. This rotates the worm 10 and accordingly moves the segmental gear 15, thus tilting the seat relatively to the tractor. Obviously, the adjustment of the seat may be very quickly made by this mechanism so that perfect comfort of the operator is assured.

It is to be particularly noted that the device is carried directly from the supporting bar 1 in a very simple manner, and may be readily attached thereto with a minimum of effort.

It will be seen further that the device is so constructed that the normal position or location of the seat is maintained and the operating or driving mechanism of the device is positioned below the supporting pin.

It will be seen further that an extremely simple construction is attained by this invention and that the device may be applied to standard tractors without disturbing their usual equipment.

Although the invention has been described in considerable detail, it is to be understood that the invention may be variously embodied and is, therefore, to be limited only as claimed.

I claim:

A seat adjuster for vehicles having a supporting, rearwardly extending spring bar, said seat adjuster comprising a pin having a cylindrical portion projecting from the end of said bar and having a flattened portion secured to said bar, a U-shaped frame carried by said cylindrical pin and having spaced arms through which said pin projects, means for locking said arms to said pin, a segmental gear revolubly mounted upon said pin, a worm meshing with said gear, a hand wheel operatively coupled with said worm, a seat mounted above said segmental gear, and means for securing said seat to said gear.

In testimony that I claim the foregoing I have hereunto set my hand at Milwaukee, in the county of Milwaukee and State of Wisconsin.

FRED AMMON.